United States Patent
Nishikawa (10) Patent No.: US 9,479,376 B2
(45) Date of Patent: Oct. 25, 2016

(54) COMMUNICATION APPARATUS AND COMMUNICATION METHOD

(75) Inventor: Nobuyoshi Nishikawa, Osaka (JP)

(73) Assignee: ICOM INCORPORATED, Osaka (JP)

( * ) Notice: Subject to any disclaimer, the term of this patent is extended or adjusted under 35 U.S.C. 154(b) by 729 days.

(21) Appl. No.: 13/561,852

(22) Filed: Jul. 30, 2012

(65) Prior Publication Data

US 2013/0107983 A1    May 2, 2013

(30) Foreign Application Priority Data

Oct. 28, 2011  (JP) ................. 2011-236790

(51) Int. Cl.
- H04K 1/10 (2006.01)
- H04J 11/00 (2006.01)
- H04L 27/26 (2006.01)
- H04L 5/00 (2006.01)

(52) U.S. Cl.
CPC ......... H04L 27/2621 (2013.01); H04L 5/0048 (2013.01)

(58) Field of Classification Search
CPC .......... H04L 27/2614; H04L 27/2613; H04L 5/0048; H04L 5/0023; H04L 5/0053
USPC ......................................... 375/260; 370/208
See application file for complete search history.

(56) References Cited

U.S. PATENT DOCUMENTS

| | | | |
|---|---|---|---|
| 6,445,747 B1 * | 9/2002 | Jafarkhani | H04L 27/2621 370/205 |
| 2003/0063556 A1 * | 4/2003 | Hernandez | H04L 27/2614 370/208 |
| 2004/0008616 A1 * | 1/2004 | Jung et al. | 370/203 |
| 2004/0028146 A1 * | 2/2004 | Winkler | H04L 27/2626 375/260 |
| 2005/0111524 A1 * | 5/2005 | Baker et al. | 375/147 |
| 2005/0232135 A1 * | 10/2005 | Mukai | H04L 5/0007 370/208 |
| 2006/0028976 A1 * | 2/2006 | Park | H04L 5/0048 370/203 |
| 2006/0245472 A1 * | 11/2006 | Pan et al. | 375/144 |
| 2007/0263738 A1 * | 11/2007 | Jitsukawa | H04L 25/03834 375/260 |
| 2008/0080560 A1 * | 4/2008 | Inoue et al. | 370/491 |
| 2009/0092195 A1 * | 4/2009 | Guo et al. | 375/260 |
| 2010/0165829 A1 * | 7/2010 | Narasimha | H04L 27/2614 370/210 |
| 2011/0092173 A1 * | 4/2011 | McCallister et al. | 455/108 |

FOREIGN PATENT DOCUMENTS

JP    2006-165781    6/2006

* cited by examiner

Primary Examiner — Daniel Washburn
Assistant Examiner — Sarah Hassan
(74) Attorney, Agent, or Firm — Warner Norcross & Judd LLP (57) ABSTRACT

A modulator generates a modulation signal from an input signal by, and a serial-parallel converter generates a subcarrier modulation signal from the modulation signal. A shifter shifts a predetermined data series to generate a shift sequence. Two IFFT units perform an IFFT on data sent thereto to generate first data and second data. An operator generates baseband signals from at least one of the sum of the first data and the second data and the difference therebetween. The foregoing processing is repeated with a predetermined number of times to shift the predetermined data series being changed. A PAPR determiner sends the baseband signal matching with a predetermined reference for determining a transmission signal to a transmitter. The transmitter generates a transmission signal from the baseband signal, and transmits the transmission signal to another communication apparatus via an antenna.

10 Claims, 6 Drawing Sheets

COMMUNICATION APPARATUS AND COMMUNICATION METHOD

CROSS REFERENCES TO RELATED APPLICATION

This application claims the benefit of Japanese Patent Application No. 2011-236790 filed on Oct. 28, 2011, the entire disclosure of which is incorporated by reference herein.

FIELD

This application relates to a communication apparatus and communication method.

BACKGROUND

In OFDM (Orthogonal Frequency-Division Multiplexing) communication, an input signal is modulated with subcarriers, and the modulated input signal is subjected to an IFFT (Inverse Fast Fourier Transformation) to generate a baseband signal. When the number of subcarriers increases to increase the FFT (Fast Fourier Transformation) size, therefore, a baseband signal with a high peak is generated, increasing the PAPR (Peak-to-Average Power Ratio). The increase in the PAPR needs an amplifier having a wide range of linearity to transfer a signal without distortion. To meet the requirement, techniques of reducing the PAPR are developed.

Unexamined Japanese Patent Application KOKAI Publication No. 2006-165781 discloses a technique for controlling the phase of a subcarrier modulation signal based on the optimal phase, calculated by a sequential decision procedure, prior to an IFFT in order to reduce the PAPR.

The OFDM communication needs to cope with reducing the PAPR. The technique disclosed in Unexamined Japanese Patent Application KOKAI Publication No. 2006-165781 needs to control the phase subcarrier by subcarrier by repeatedly calculating the optimal phase to reduce the PAPR.

SUMMARY

Accordingly, it is an object of the present invention to suppress an increase in PAPR which is caused by an increase in the number of subcarriers in OFDM communication to thereby simplify the process of suppressing an increase in PAPR.

To achieve the object, according to a first aspect of the invention, there is provided a communication apparatus for communicating with another apparatus in orthogonal frequency-division multiplexing wireless communication, the communication apparatus comprising:

a modulator that modulates an input signal by a predetermined modulation scheme, and assigns the modulated input signal to subcarriers with frequency components orthogonal to each other, thereby generating a subcarrier modulation signal;

a first transformer that performs an inverse fast Fourier transformation on the subcarrier modulation signal to generate first data;

a shifter that shifts a predetermined data series which is a set of data in a predetermined direction by a predetermined number of times to generate a shift sequence, the predetermined data series having an autocorrelation property such that an autocorrelation value of the predetermined data series with a data series whose data has not been shifted is higher than an autocorrelation value of the predetermined data series with a data series whose data has been shifted;

a second transformer that performs an inverse fast Fourier transformation on the shift sequence to generate second data;

a calculator that respectively generates baseband signals from the first data and from at least one of data obtained by adding the second data to the first data and data obtained by subtracting the second data from the first data, and calculates a PAPR (Peak-to-Average Power Ratio) of each of the baseband signals;

a repeater that repeats processes of the shifter, the second transformer, and the calculator with the predetermined number of times to shift the predetermined data series being changed; and a transmitter that generates a transmission signal from that of the generated baseband signals which matches with a reference for determining the transmission signal, and transmits the transmission signal.

It is preferable that the calculator respectively generates baseband signals from the data obtained by adding the second data to the first data, and the data obtained by subtracting the second data from the first data, and the repeater repeats the processes of the shifter, the second transformer, and the calculator with the predetermined number of times to shift the predetermined data series being changed, until detection of a baseband signal whose PAPR matches with a predetermined reference, or until completion of one cycle of shifting of the data in the predetermined data series.

It is preferable that the shifter may use a CAZAC sequence as the predetermined data series.

It is preferable the shifter may use a Chu sequence as the CAZAC sequence.

It is preferable that an each element in the Chu sequence is defined by a complex trigonometric function having, as a phase, a value obtained by multiplying a phase of a half period of the subcarriers by a square of a number indicating the each element and dividing by a size of a fast Fourier transformation.

According to a second aspect of the invention, there is provided a communication apparatus for communicating with another apparatus in orthogonal frequency-division multiplexing wireless communication, the communication apparatus comprising:

a receiver that receives a transmission signal and generates a baseband signal;

a serial-parallel converter that performs serial-parallel conversion on the baseband signal to generate a parallel signal;

a reception-side shifter that shifts a predetermined data series which is a set of data in a predetermined direction by a predetermined number of times to generate a reception shift sequence, the predetermined data series having an autocorrelation property such that an autocorrelation value of the predetermined data series with a data series whose data has not been shifted is higher than an autocorrelation value of the predetermined data series with a data series whose data has been shifted;

a third transformer that performs an inverse fast Fourier transformation on the reception shift sequence to generate third data;

a correlation determiner that determines based a predetermined reference whether the parallel signal and the third data are correlated with each other;

a reception-side repeater that repeats processes of the reception-side shifter, the third transformer, and the correlation determiner with the predetermined number of times to shift the predetermined data series being changed, until it is detected that the parallel signal and the third data are correlated with each other, or until one cycle of shifting of the data in the predetermined data series is completed;

a fourth transformer that generates a subcarrier modulation signal by performing a fast Fourier transformation on data obtained by subtracting the third data from the parallel signal when it is determined that the parallel signal and the third data have a positive correlation with each other, performing a fast Fourier transformation on data obtained by adding the third data to the parallel signal when it is determined that the parallel signal and the third data have a negative correlation with each other, and performing a fast Fourier transformation on the parallel signal when it is determined that the parallel signal and the third data are not correlated with each other even when one cycle of shifting of the data in the predetermined data series is completed; and a demodulator that demodulates the subcarrier modulation signal by a predetermined demodulation scheme.

It is preferable that the reception-side shifter may use a CAZAC sequence as the predetermined data series.

It is preferable that the reception-side shifter may use a Chu sequence as the CAZAC sequence.

It is preferable that an each element in the Chu sequence is defined by a complex trigonometric function having, as a phase, a value obtained by multiplying a phase of a half period of the subcarriers by a square of a number indicating the each element and dividing by a size of a fast Fourier transformation.

According to a third aspect of the invention, there is provided a communication method that is executed by a communication apparatus communicating with another apparatus in orthogonal frequency-division multiplexing wireless communication, the communication apparatus method comprising:

a modulation step of modulating an input signal by a predetermined modulation scheme, and assigns the modulated input signal to subcarriers with frequency components orthogonal to each other, thereby generating a subcarrier modulation signal;

a first transformation step of performing an inverse fast Fourier transformation on the subcarrier modulation signal to generate first data;

a shift step of shifting a predetermined data series which is a set of data in a predetermined direction by a predetermined number of times to generate a shift sequence, the predetermined data series having an autocorrelation property such that an autocorrelation value of the predetermined data series with a data series whose data has not been shifted is higher than an autocorrelation value of the predetermined data series with a data series whose data has been shifted;

a second transformation step of performing an inverse fast Fourier transformation on the shift sequence to generate second data;

a calculation step of respectively generating baseband signals from the first data and from at least one of data obtained by adding the second data to the first data and data obtained by subtracting the second data from the first data, and calculating a PAPR (Peak-to-Average Power Ratio) of each of the baseband signals;

a repetition step of repeating processes of the shift step, the second transformation step, and the calculation step with the predetermined number of times to shift the predetermined data series being changed; and a transmission step of generating a transmission signal from that of the generated baseband signals which matches with a reference for determining the transmission signal, and transmits the transmission signal.

According to a fourth aspect of the invention, there is provided a communication method that is executed by a communication apparatus communicating with another apparatus in orthogonal frequency-division multiplexing wireless communication, the communication apparatus method comprising:

a reception step of receiving a transmission signal and generates a baseband signal;

a serial-parallel conversion step of performing serial-parallel conversion on the baseband signal to generate a parallel signal;

a reception-side shift step of shifting a predetermined data series which is a set of data in a predetermined direction by a predetermined number of times to generate a reception shift sequence, the predetermined data series having an autocorrelation property such that an autocorrelation value of the predetermined data series with a data series whose data has not been shifted is higher than an autocorrelation value of the predetermined data series with a data series whose data has been shifted;

a third transformation step of performing an inverse fast Fourier transformation on the reception shift sequence to generate third data;

a correlation determining step of determining based a predetermined reference whether the parallel signal and the third data are correlated with each other;

a reception-side repetition step of repeating processes of the reception-side shift step, the third transformation step, and the correlation determining step with the predetermined number of times to shift the predetermined data series being changed, until it is detected that the parallel signal and the third data are correlated with each other, or until one cycle of shifting of the data in the predetermined data series is completed;

a fourth transformation step of generating a subcarrier modulation signal by performing a fast Fourier transformation on data obtained by subtracting the third data from the parallel signal when it is determined that the parallel signal and the third data have a positive correlation with each other, performing a fast Fourier transformation on data obtained by adding the third data to the parallel signal when it is determined that the parallel signal and the third data have a negative correlation with each other, and performing a fast Fourier transformation on the parallel signal when it is determined that the parallel signal and the third data are not correlated with each other even when one cycle of shifting of the data in the predetermined data series is completed; and a demodulation step of demodulating the subcarrier modulation signal by a predetermined demodulation scheme.

With the foregoing configurations, the invention can suppress an increase in PAPR which is caused by an increase in the number of subcarriers in OFDM (Orthogonal Frequency-Division Multiplexing) communication to thereby simplify the process of suppressing an increase in PAPR.

BRIEF DESCRIPTION OF THE DRAWINGS

A more complete understanding of this application can be obtained when the following detailed description is considered in conjunction with the following drawings, in which.

DETAILED DESCRIPTION

An exemplary embodiment of the invention will be described in detail hereinbelow with reference to the accompanying drawings. Like or same reference numerals are given to those components which are the same as, or correspond to, the components shown in the diagrams. An IFFT (Inverse Fast Fourier Transformation) is a concept including both IFFT and IDFT (Inverse Discrete Fourier Transformation) hereinafter. Therefore, the embodiment may be configured to perform an IDFT instead of an IFFT. Likewise, an FFT (Fast Fourier Transformation) is a concept including both FFT and DFT (Discrete Fourier Transformation) hereinafter. When an IDFT and a DFT are carried out, an FFT size means the size of a DFT hereinafter.

Figure 1:
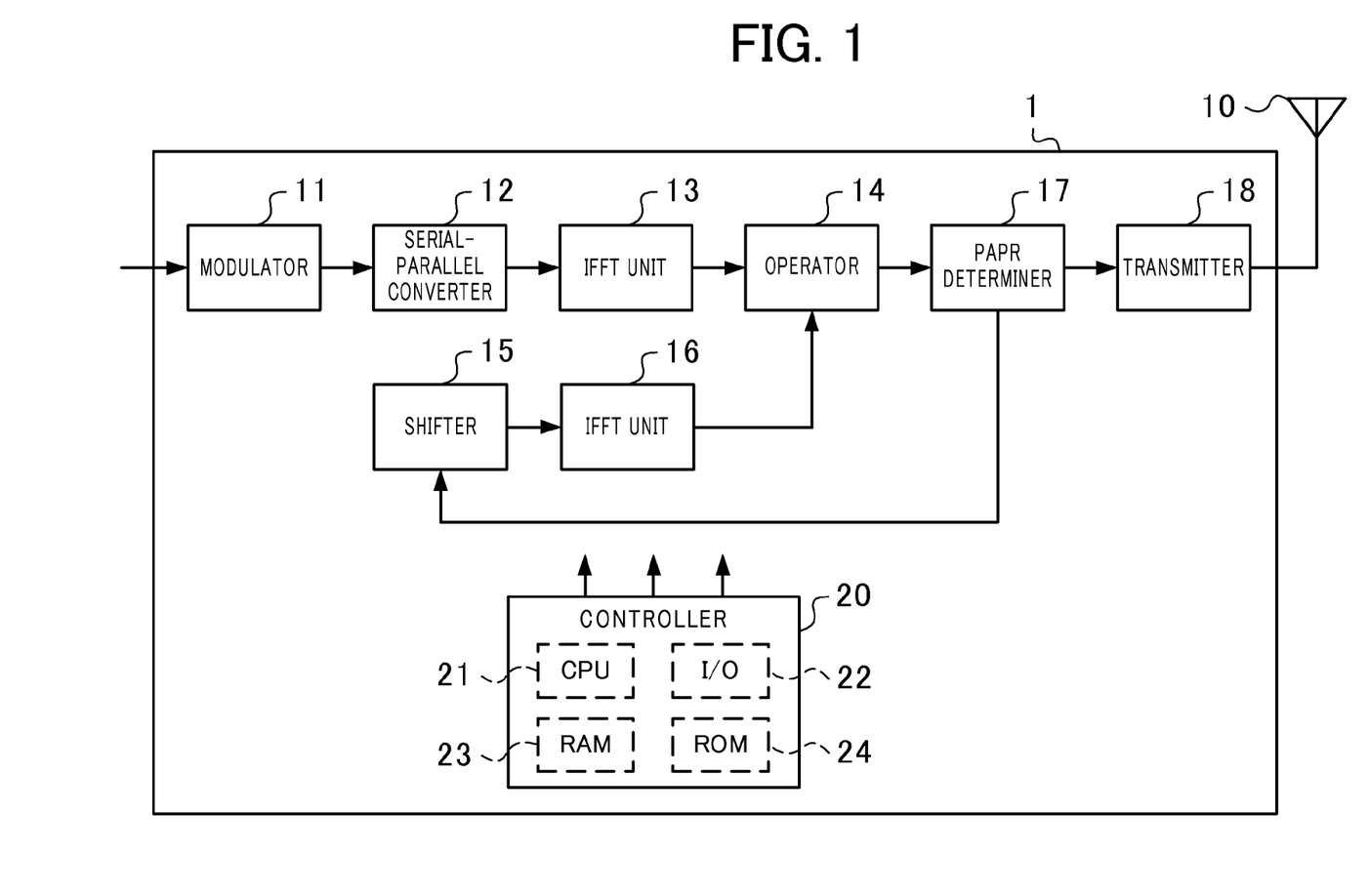
FIG. 1 is a block diagram illustrating a configuration example of a communication apparatus according to an exemplary embodiment of the invention.

FIG. 1 is a block diagram illustrating a configuration example of a communication apparatus 1 according to an exemplary embodiment of the invention. The communication apparatus 1 communicates with another apparatus using OFDM (Orthogonal Frequency-Division Multiplexing) wireless communication. The communication apparatus 1 includes an antenna 10, a modulator 11, a serial-parallel converter 12, IFFT units 13, 16, an operator 14, a shifter 15, a PAPR determiner 17, a transmitter 18, and a controller 20.

The controller 20 includes a CPU (Central Processing Unit) 21, RAM (Random Access Memory) 23, and ROM (Read-Only Memory) 24. Although signal lines from the controller 20 to the individual components are omitted to avoid complication and for the ease of understanding, the controller 20 is connected to the individual components of the communication apparatus 1 via an I/O (Input/Output) unit 22 to start and terminate the processes of the components and control the contents of the processes.

The RAM 23 stores data for generating a transmission frame, for example. The ROM 24 stores a control program for the controller 20 to control the operation of the communication apparatus 1. The controller 20 controls the communication apparatus 1 based on the control program.

Figure 2:
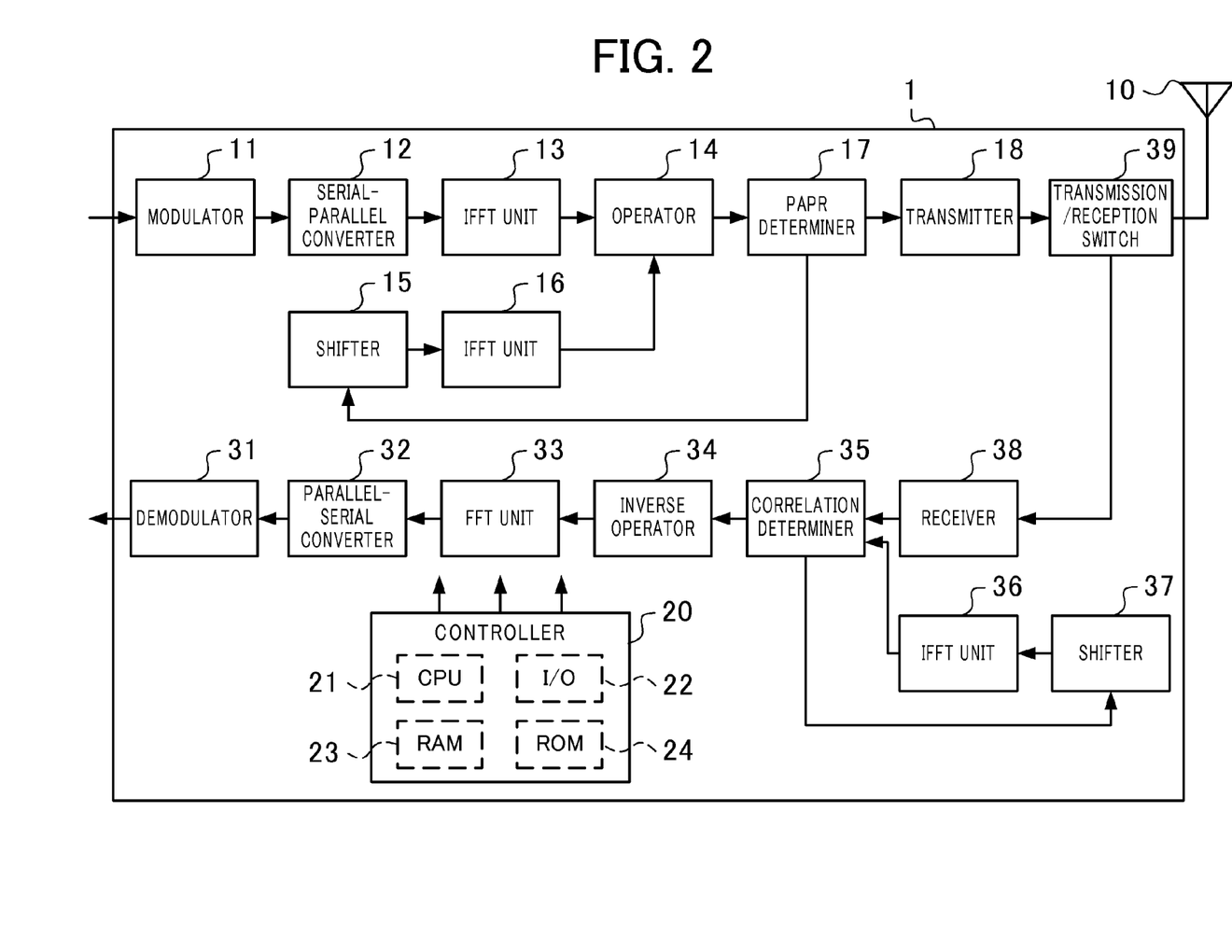
FIG. 2 is a block diagram illustrating a different configuration example of the communication apparatus according to the embodiment.

FIG. 2 is a block diagram illustrating a different configuration example of the communication apparatus 1 according to the embodiment. To provide the communication apparatus 1 with a reception function, the communication apparatus 1 shown in FIG. 2 further includes a demodulator 31, a parallel-serial converter 32, an FFT unit 33, an inverse operator 34, a correlation determiner 35, an IFFT unit 36, a shifter 37, a receiver 38, and a transmission/reception switch 39. Referring to the communication apparatus 1 shown in FIG. 2 which has the transmission function and the reception function, a communication method which is carried out by the communication apparatus 1 will be described hereinbelow.

The modulator 11 modulates an input signal by a predetermined modulation scheme to generate a modulation signal. The modulator 11 sends the generated modulation signal to the serial-parallel converter 12. The modulator 11 uses, for example, QPSK (Quadrature Phase-Shift Keying) as the modulation scheme. The serial-parallel converter 12 performs serial-parallel conversion on the modulation signal to generate a parallel signal, and assigns the generated parallel signal to subcarriers with frequency components orthogonal to each other to generate a subcarrier modulation signal. The serial-parallel converter 12 sends the generated subcarrier modulation signal to the IFFT unit 13.

The IFFT unit 13 performs an IFFT on the subcarrier modulation signal to generate first data, and sends the generated first data to the operator 14. The shifter 15 shifts a predetermined data series having an autocorrelation value in a predetermined direction by a predetermined number of times to thereby generate a shift sequence. A data series is a set of data. The predetermined data series having an autocorrelation property is a data series such that the autocorrelation value of the predetermined data series with a data series whose data has not been shifted is higher than the autocorrelation value of the predetermined data series with a data series whose data has been shifted, and such that the number of times of data shifting which has been carried out on the transmission side can be detected on the reception side, as will be described later.

A CAZAC (Constant Amplitude Zero Auto-Correlation) sequence, for example, can be used as a data series. For example, a Chu sequence with a high general versatility, which can cope with an arbitrary sequential length can be used as a CAZAC sequence. An element in a Chu sequence c is defined by a complex trigonometric function having, as a phase, a value obtained by multiplying the phase, π, of a half period of the subcarriers by a square of a number a indicating the element and dividing by the size of the fast Fourier transformation, as expressed by the following equation (1) where i is an imaginary unit. The number a indicating an element has a minimum value of "1", and a maximum value which is an FFT size N.

[Eq. 1]

$$c_a = \exp\left[i\frac{\pi \cdot a^2}{N}\right] \quad (a = 1, 2, \ldots, N) \tag{1}$$

The shifter 15 shifts data in a Chu sequence c expressed by, for example, the following equation (2), m times upward.

[Eq. 2]

$$c = \begin{bmatrix} c_1 \\ c_2 \\ \vdots \\ c_m \\ \vdots \\ c_N \end{bmatrix} \tag{2}$$

A shift sequence generated by shifting data in the Chu sequence c m times upward is expressed by $c^{(m)}$. This is true of the following description. $c^{(m)}$ is expressed by the following equation (3).

[Eq. 3]

$$c^{(m)} = \begin{bmatrix} c_{m+1} \\ c_{m+2} \\ \vdots \\ c_N \\ \vdots \\ c_m \end{bmatrix} \quad (3)$$

The shifter 15 sends the first data u to the IFFT unit 16. The IFFT unit 16 performs an IFFT on the shift sequence $c^{(m)}$ to generate second data, and sends the generated second data to the operator 14. Hereinafter, the first data that is generated by the IFFT unit 13 performing an IFFT on a subcarrier modulation signal d is expressed by "u", and the second data that is generated by the IFFT unit 16 performing an IFFT on the shift sequence $c^{(m)}$ is expressed by "$u_c^{(m)}$". The operator 14 respectively generates baseband signals from the first data u expressed by the following equation (4a), data expressed by the following equation (4b) and obtained by adding the second data $u_c^{(m)}$ to the first data u, and data expressed by the following equation (4c) and obtained by subtracting the second data $u_c^{(m)}$ from the first data u. The operator 14 sends the generated baseband signals to the PAPR determiner 17.

[Eq. 4]

$$r=u \quad (4a)$$

$$r=u+u_c^{(m)} \quad (4b)$$

$$r=u-u_c^{(m)} \quad (4c)$$

The PAPR determiner 17 calculates the PAPR (Peak-to-Average Power Ratio) of each of the sent baseband signals, and determines whether the PAPR of each baseband signal matches with a predetermined reference. The PAPR determiner 17 determines that, for example, a baseband signal whose PAPR is equal to or less than a predetermined value matches with the predetermined reference, and a baseband signal whose PAPR is greater than the predetermined value does not match with the predetermined reference.

When there is no baseband signal which matches with the predetermined reference, the PAPR determiner 17 sends a shift command to the shifter 15. The shifter 15 having received the shift command further performs single upward data shifting of, for example, the shift sequence $c^{(m)}$ to newly generate a shift sequence $c^{(m+1)}$. The shifter 15 sends the generated shift sequence $c^{(m+1)}$ to the IFFT unit 16. The IFFT unit 16 performs an IFFT on the shift sequence $c^{(m+1)}$ in the above-described manner to newly generate second data, and sends the generated second data to the operator 14. The operator 14 newly generates a baseband signal from data obtained by adding the second data to the first data, and newly generates a baseband signal from data obtained by subtracting the second data from the first data. The operator 14 sends the newly generated baseband signals to the PAPR determiner 17.

The PAPR determiner 17 determines whether the PAPR of each baseband signal sent in the aforementioned way matches with a predetermined reference. Then, the processing from the transmission of the shift command to the determination of a PAPR is repeated until detection of a baseband signal whose PAPR matches with the predetermined reference, or until one cycle of shifting of data in the Chu sequence c is completed. Because the first data does not change regardless of shifting of the data in the Chu sequence c, the process of the operator 14 to generate a baseband signal from the first data is not repeated.

When a baseband signal matching with the predetermined reference is detected, or when one cycle of shifting of data in the Chu sequence c is completed, the PAPR determiner 17 detects a baseband signal which matches with a reference for determining a transmission signal, and sends the baseband signal to the transmitter 18. When there is a single baseband signal which matches with the predetermined reference, the PAPR determiner 17 sends the baseband signal to the transmitter 18. When there are a plurality of baseband signals which match with the predetermined reference, a reference for detecting a baseband signal with a smallest PAPR, for example, is set beforehand as the reference for determining a transmission signal. The PAPR determiner 17 detects a baseband signal with a smallest PAPR among a plurality of baseband signals matching with the predetermined reference, and sends the baseband signal to the transmitter 18.

When a baseband signal matching with the predetermined reference is not detected upon completion of one cycle of shifting of data in the Chu sequence c, the PAPR determiner 17 detects, for example, a baseband signal with a smallest PAPR, and sends the baseband signal to the transmitter 18.

A method of determining whether the processing from the transmission of the shift command to the determination of a PAPR is repeated or not is not limited to the foregoing method. When this processing is repeated a predetermined number of times or more, for example, the PAPR determiner 17 may be configured to detect a baseband signal with a smallest PAPR among the generated baseband signals, and send the baseband signal to the transmitter 18. Further, the method of shifting data in a Chu sequence c is not limited to the foregoing method. Data shifting may be carried out downward, or a shift number (the number of shifts) may be set at random.

The PAPR determiner 17 may not calculate the PAPR of a baseband signal and determine whether the PAPR matches with a predetermined reference every time the baseband signal is sent from the operator 14 in the aforementioned manner. For example, the PAPR determiner 17 may be configured to calculate the PAPRs of all baseband signals to detect a baseband signal with a smallest PAPR after one cycle of shifting of data in the Chu sequence c is completed, and send the baseband signal to the transmitter 18.

Because the PAPR determiner 17 can select a baseband signal with a smallest PAPR among a plurality of baseband signals as a transmission signal, the PAPR can be reduced.

The transmitter 18 generates a transmission signal from the baseband signal, and transmits the transmission signal to another communication apparatus via the transmission/reception switch 39 and the antenna 10.

Figure 3:
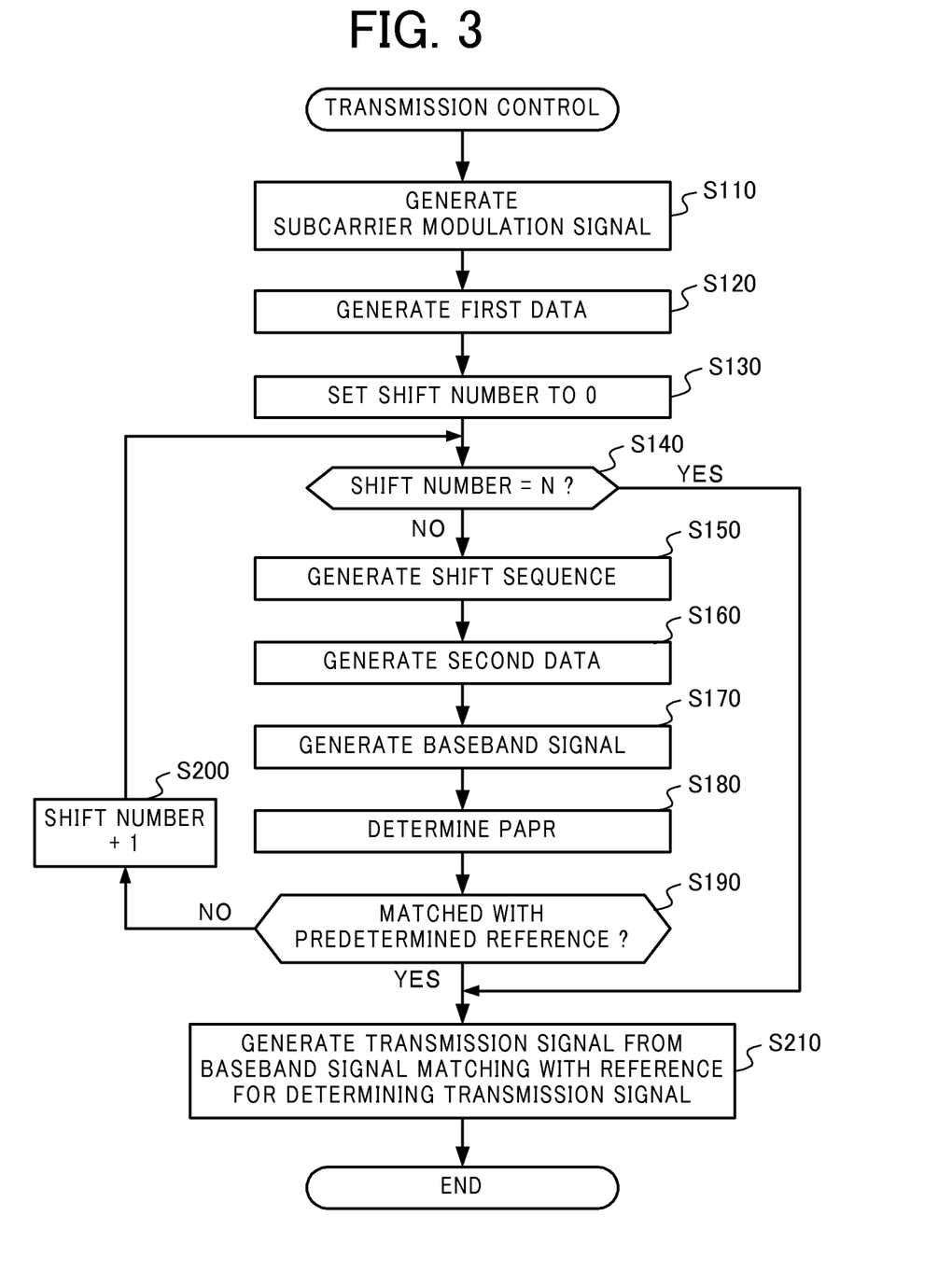
FIG. 3 is a flowchart illustrating an example of the operation for transmission control that is executed by a communication apparatus according to the embodiment.

FIG. 3 is a flowchart illustrating an example of the operation for transmission control that is executed by the communication apparatus according to the embodiment. The modulator 11 modulates an input signal by a predetermined modulation scheme to generate a modulation signal. The serial-parallel converter 12 performs serial-parallel conversion on the generated modulation signal, and assigns a resultant parallel signal to subcarriers with frequency components orthogonal to each other to generate a subcarrier modulation signal (step S110). The IFFT unit 13 performs an IFFT on the subcarrier modulation signal to generate first data (step S120).

Then, the initial value of the shift number is set to "0" (step S130). Because the shift number is not "N" (step S140: NO), the shifter 15 shifts data in a Chu sequence c upward by the set shift number, i.e., performs no shifting in this case, thereby generating a shift sequence (step S150). Because the shift number is "0", the generated shift sequence is identical to the Chu sequence c. The IFFT unit 16 performs an IFFT on the generated shift sequence to generate second data (step S160).

The operator 14 generates baseband signals from the first data, data obtained by adding the second data to the first data, and data obtained by subtracting the second data from the first data (step S170). Then, the PAPR determiner 17 calculates the PAPRs of the baseband signals to determine whether each PAPR matches with a predetermined reference (step S180). When there is no baseband signal whose PAPR matches with the predetermined reference (step S190: NO), the shift number is incremented by "1" (step S200), and the transmission control routine returns to step S140 to repeat the foregoing sequence of processes.

When the foregoing sequence of processes is repeated and one cycle of shifting of data in the Chu sequence c is completed so that the shift number reaches "N" (step S140: YES), the transmission control routine proceeds to step S210. When it is determined in step S180 that the PAPR matches with the predetermined reference (step S190: YES), the transmission control routine also proceeds to step S210. Then, the PAPR determiner 17 detects a baseband signal which matches with the reference for determining a transmission signal, and the transmitter 18 generates a transmission signal from the detected baseband signal and transmits the transmission signal (step S210). When the transmission process in step S210 completes, the transmission control routine is terminated.

The processing on the reception side will be described hereinbelow. The receiver 38 receives the transmission signal via the antenna 10 and the transmission/reception switch 39, and generates a baseband signal. The receiver 38 performs parallel-serial conversion on the baseband signal to generate a parallel signal, and sends the generated parallel signal to the correlation determiner 35. The shifter 37 generates a reception shift sequence by shifting data in a predetermined data series having an autocorrelation property in a predetermined direction by a predetermined number of times. The predetermined data series is the data series that is used on the transmission side. The shifter 37 uses the same data series as the Chu sequence c that is the data series used by the shifter 15. The shifter 37 generates a reception shift sequence $c^{(n)}$ by shifting data in the Chu sequence c upward n times, and sends the reception shift sequence $c^{(n)}$ to the IFFT unit 36. The IFFT unit 36 performs an IFFT on the reception shift sequence $c^{(n)}$ to generate third data, and sends the generated third data to the correlation determiner 35.

The parallel signal is expressed by one of the equations (4a) to (4c). Based on a predetermined reference, the correlation determiner 35 determines whether the parallel signal and the third data are correlated with each other. It is possible to specify which one of the equations (4a) to (4c) expresses the parallel signal based on the correlation between the parallel signal and the third data which is determined by the correlation determiner 35.

The correlation determiner 35 performs autocorrelation analysis, for example, and determines that the parallel signal and the third data have a positive correlation with each other when a positive peak of the autocorrelation value is positioned at the origin, determines that the parallel signal and the third data have a negative correlation with each other when a negative peak of the autocorrelation value is positioned at the origin, and determines that the parallel signal and the third data are not correlated with each other when the peak of the autocorrelation value is not positioned at the origin.

When having determined that the parallel signal and the third data are not correlated with each other, the correlation determiner 35 sends a shift command to the shifter 37. The shifter 37 having received the shift command further performs single upward data shifting of, for example, the reception shift sequence $c^{(n)}$ to newly generate a shift sequence $c^{(n+1)}$. The shifter 37 sends the generated reception shift sequence $c^{(n+1)}$ to the IFFT unit 36. The IFFT unit 36 performs an IFFT on the reception shift sequence $c^{(n+1)}$ in the above-described manner to newly generate third data, and sends the generated third data to the correlation determiner 35. Based on the predetermined reference, the correlation determiner 35 determines whether the parallel signal and the new third data are correlated with each other. The processing from the transmission of the shift command to the determination of correlation is repeated until detection of a correlation between the parallel signal and the third data, or until completion of one cycle of shifting of data in the Chu sequence c. The method of shifting data in the reception shift sequence $c^{(n)}$ is not limited to the foregoing method. Data shifting may be carried out downward, or the shift number may be set at random.

When having determined that the parallel signal and the third data are correlated with each other, or that one cycle of shifting of data in the Chu sequence c is completed, the correlation determiner 35 sends the parallel signal, the third data and the correlation determining result to the inverse operator 34. When having determined that the parallel signal and the third data have a positive correlation or a negative correlation with each other, the correlation determiner 35 sends the correlation determining result indicating the presence of a positive correlation or a negative correlation to the inverse operator 34. When it is not detected that the parallel signal and the third data are correlated with each other even upon completion of one cycle of shifting of the data in the Chu sequence c, the correlation determiner 35 sends the correlation determining result indicating the presence of no correlation to the inverse operator 34. Apparently, the correlation determiner 35 need not determine whether a parallel signal and third data are correlated with each other every time the third data is sent from the IFFT unit 36. For example, the correlation determiner 35 may be configured to analyze the correlation between every piece of third data and a parallel signal after one cycle of shifting of data in the reception shift sequence $c^{(n)}$ is completed, and, with regard to the third data which is determined to have a highest correlation, send the parallel signal, the third data and the correlation determining result to the inverse operator 34.

The inverse operator 34 performs an operation based on the correlation determining result, and sends the operation result to the FFT unit 33. The third data which is generated by the IFFT unit 36 performing an IFFT on the shift sequence $c^{(n)}$ is expressed by $v_c^{(n)}$. When the correlation determining result shows that the parallel signal and the third data $v_c^{(n)}$ have a positive correlation with each other, the inverse operator 34 sends data obtained by subtracting the third data $v_c^{(n)}$ from the parallel signal to the FFT unit 33 as an operation result r'. The operation result r' is expressed by the following equation (5a). When the parallel signal and the third data $v_c^{(n)}$ have a positive correlation with each other, the parallel signal is expressed by the equation (4a), so that the following equation (5b) is derived. When the parallel signal and the third data $v_c^{(n)}$ have a positive correlation or a negative correlation with each other, m=n and $u_c^{(m)}=v_c^{(n)}$, so that the following equation (5c) is derived, and the operation result r' coincides with the first data u.

[Eq. 5]

$$r' = r - v_c^{(n)} \quad (5a)$$
$$= u + u_c^{(m)} - v_c^{(n)} \quad (5b)$$
$$= u \quad (5c)$$

When the correlation determining result shows that the parallel signal and the third data $v_c^{(n)}$ have a negative correlation with each other, the inverse operator 34 sends data obtained by adding the third data $v_c^{(n)}$ to the parallel signal to the FFT unit 33 as the operation result r'. The operation result r' is expressed by the following equation (6a). When the parallel signal and the third data $v_c^{(n)}$ have a negative correlation with each other, the parallel signal is expressed by the equation (4b), so that the following equation (6b) is derived. Because $u_c^{(m)}=v_c^{(n)}$, the following equation (6c) is derived, and the operation result r' coincides with the first data u.

[Eq. 6]

$$r' = r + v_c^{(n)} \quad (6a)$$
$$= u - u_c^{(m)} + v_c^{(n)} \quad (6b)$$
$$= u \quad (6c)$$

When the parallel signal and the third data $v_c^{(n)}$ are not correlated with each other, the parallel signal is expressed by the equation (4c). When the correlation determining result shows that the parallel signal and the third data $v_c^{(n)}$ are not correlated with each other, the inverse operator 34 sends the parallel signal to the FFT unit 33 as the operation result r'. The operation result r' coincides with the first data u.

The FFT unit 33 performs an FFT on the operation result r' to generate a subcarrier modulation signal d, and sends the subcarrier modulation signal d to the parallel-serial converter 32. The parallel-serial converter 32 performs parallel-serial conversion on the subcarrier modulation signal d to generate a serial signal, and sends the serial signal to the demodulator 31. The demodulator 31 demodulates the serial signal by a predetermined demodulation scheme. For example, the demodulator 31 performs QPSK demodulation on the serial signal. Accordingly, the demodulator 31 can demodulate the input signal modulated by the modulator 11, and output the demodulated signal.

Figure 4:
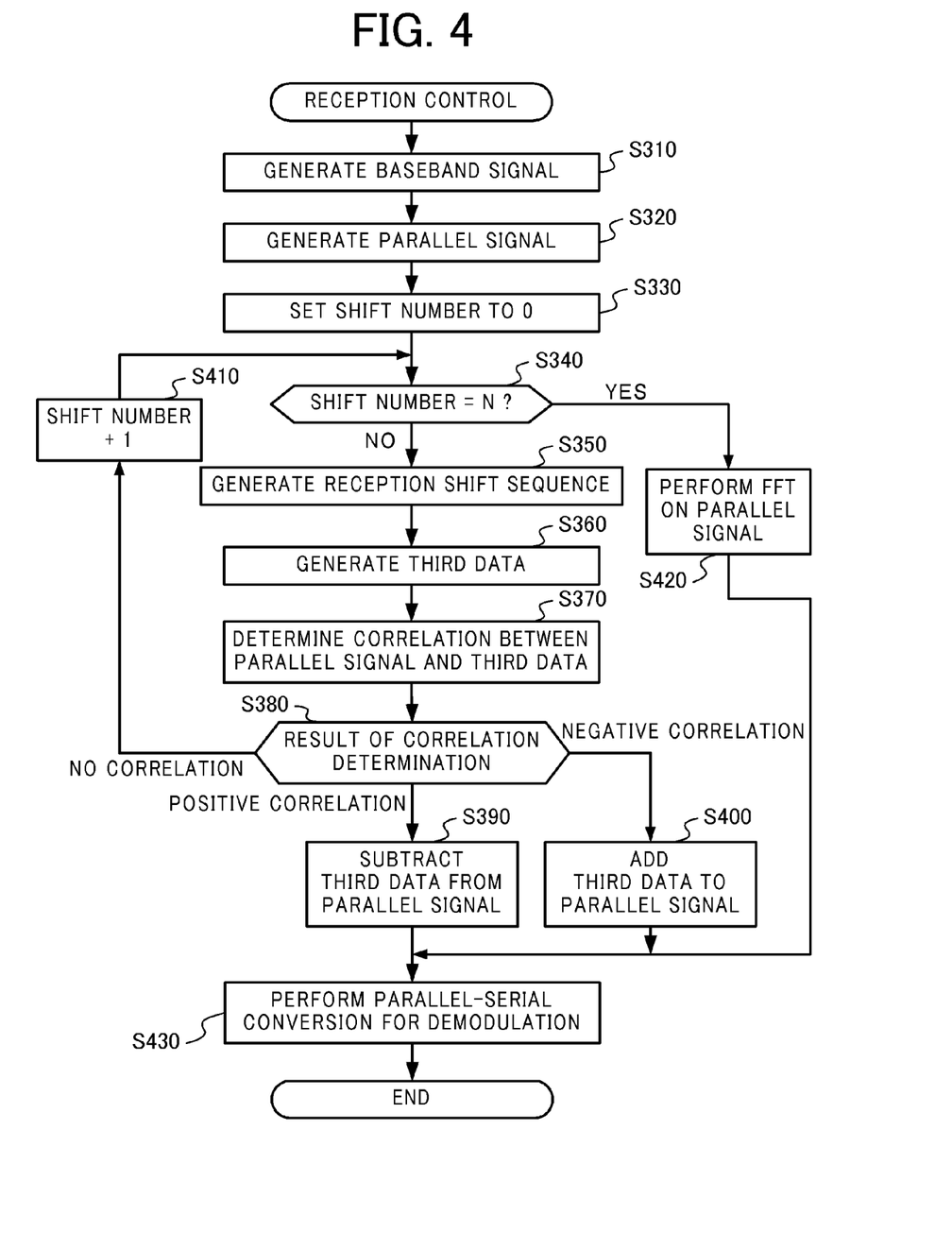
FIG. 4 is a flowchart illustrating an example of the operation for reception control that is executed by a communication apparatus according to the embodiment.

FIG. 4 is a flowchart illustrating an example of the operation for reception control that is executed by the communication apparatus according to the embodiment. The receiver 38 receives a transmission signal via the antenna 10 and the transmission/reception switch 39, and generates a baseband signal (step S310). The receiver 38 performs serial-parallel conversion on the baseband signal to generate a parallel signal (step S320).

The initial value of the shift number is set to "0" (step S330). Because the shift number is not "N" (step S340: NO), the shifter 37 shifts data in the Chu sequence c, which is the data series used by the shifter 15, upward by the set shift number, i.e., performs no shifting in this case, thereby generating a reception shift sequence (step S350). Because the shift number is "0", the generated reception shift sequence is identical to the Chu sequence c. The IFFT unit 36 performs an IFFT on the generated reception shift sequence to generate third data (step S360).

The correlation determiner 35 determines whether the parallel signal and the third data are correlated with each other (step S370). When it is determined that there is a positive correlation (step S380: POSITIVE CORRELATION), the inverse operator 34 subtracts the third data from the parallel signal. Then, the FFT unit 33 performs an FFT on data obtained by subtracting the third data from the parallel signal (step S390), and the reception control routine proceeds to step S430. When it is determined that there is a negative correlation (step S380: NEGATIVE CORRELATION), the inverse operator 34 adds the third data to the parallel signal. Then, the FFT unit 33 performs an FFT on data obtained by adding the third data to the parallel signal (step S400), and the reception control routine proceeds to step S430. When it is determined that there is no correlation (step S380: NO CORRELATION), the shift number is incremented by "1" (step S410), and the reception control routine proceeds to step S340 to repeat the foregoing sequence of processes. When the foregoing sequence of processes is repeated and one cycle of shifting of data in the Chu sequence c is completed so that the shift number reaches "N" (step S340: YES), the FFT unit 33 performs an FFT on the parallel signal (step S420), and the reception control routine proceeds to step S430.

The parallel-serial converter 32 performs parallel-serial conversion on the subcarrier modulation signal generated by an FFT, and the demodulator 31 demodulates the resultant serial signal by a predetermined demodulation scheme (step S430). When the demodulation process in step S430 is completed, the routine is terminated.

As described above, the communication apparatus 1 according to the embodiment of the invention suppresses an increase in PAPR which is caused by an increase in the number of subcarriers using a data series, and does not need the process of controlling the phase for each subcarrier. This can therefore simplify the process of suppressing an increase in PAPR.

Next, the simulated advantages of the invention according to the embodiment will be described. Simulation of generating baseband signals was carried out on a case where an operation was not additionally performed on an input signal in the operator 14 as in the related art, a case where second data was added to the input signal, and a case where second data was subtracted from the input signal. A random signal was used as the input signal, and QPSK was used as the modulation scheme. The PAPR characteristics were compared while changing the number of subcarriers and the FFT size to 4, 8, 16, 32, 64, 128, 256, 512, 1024, 2048, 4096, and 8192.

Figure 5:
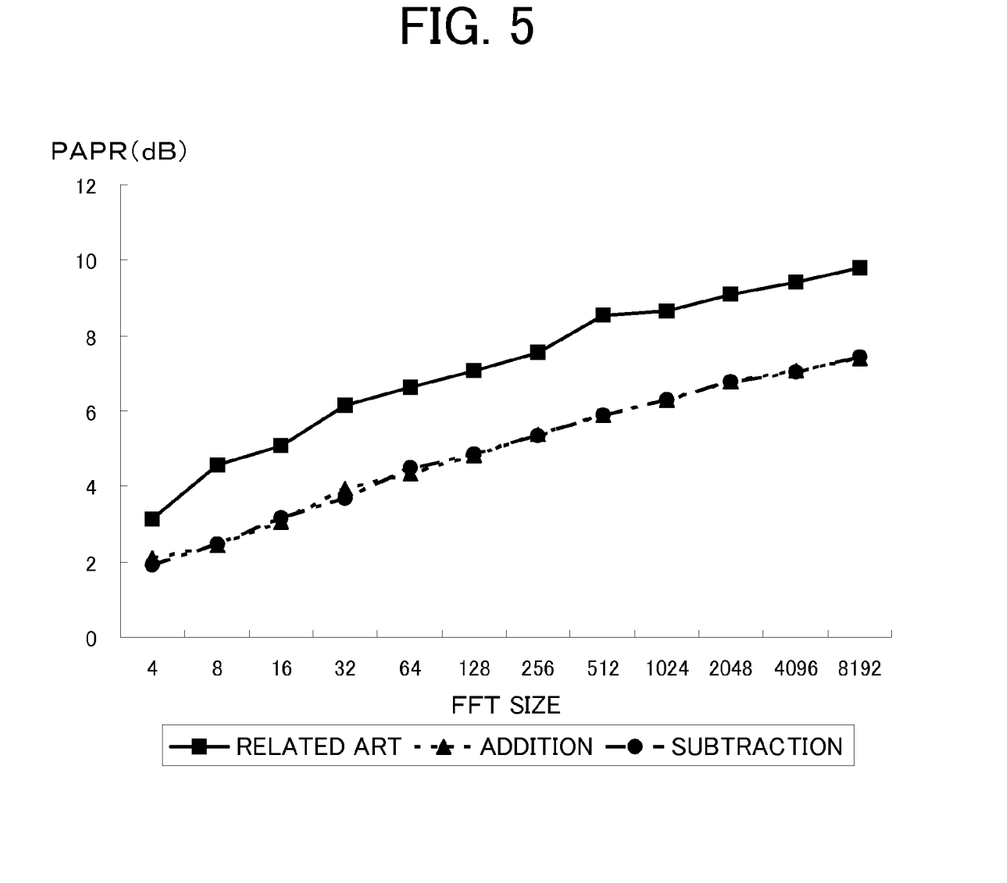
FIG. 5 is a diagram illustrating the PAPR characteristics of simulated baseband signals.

FIG. 5 is a diagram illustrating the PAPR characteristics of the simulated baseband signals. The abscissa represents the FFT size, and the ordinate represents the PAPR (unit: dB). A random signals was used as an input signal, and the PAPR in the case where the operator 14 performed no additional operation as in the related art, the PAPR in the case where second data was added to first data, and the PAPR in the case where second data was subtracted from first data were calculated. With regard to the PAPR in the case of performing addition or subtraction in the operator 14, shifting of data in the Chu sequence c was repeated to calculate a minimum PAPR. This processing was executed for 30 input signals, and the PAPR averages were calculated for the individual FFT sizes, and were plotted. A solid-line graph showing the plot points by squares represents the PAPR in the case of performing no additional operation in the operator 14 as in the related art. A dotted-line graph showing the plot points by triangles represents the PAPR in the case of adding the second data to first data in the operator 14. A dashed-line graph showing the plot points by round dots represents the PAPR in the case of subtracting the second data from first data in the operator 14.

The communication apparatus 1 according to the embodiment generates and transmits a transmission signal based on a baseband signal with the lowest PAPR among baseband signals generated by the operator 14 from first data, data obtained by adding second data to the first data, and data obtained by subtracting the second data from the first data. Therefore, the PAPR of the baseband signal that is generated by the communication apparatus 1 according to the embodiment coincides with a minimum value in each graph in FIG. 5. When the operator 14 performs addition or subtraction, the PAPR is apparently reduced by about 2 dB for each FFT size as compared with the case of the related art where the operator 14 does not perform an additional operation. The embodiment of the invention can therefore suppress an increase in PAPR which is caused by an increase in the number of subcarriers.

Figure 6:
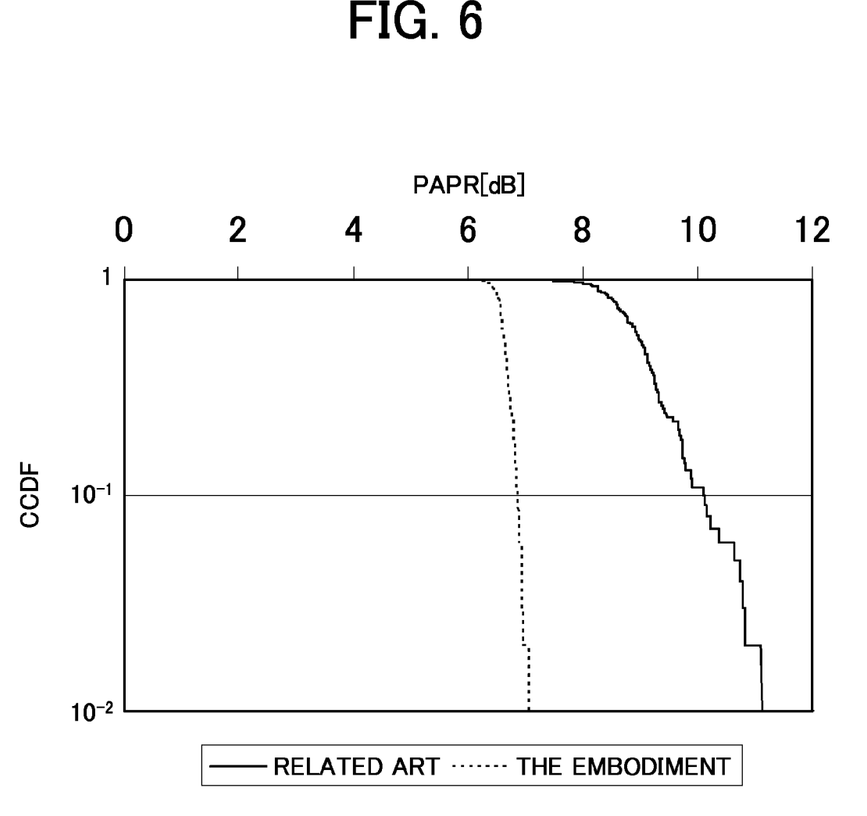
FIG. 6 is a diagram illustrating simulated CCDF characteristics of the PAPRs of baseband signals.

In addition, the CCDF (Complementary Cumulative Distribution Function) of the PAPR, i.e., the characteristic of the probability of occurrence of the PAPR, according to the related art was compared with the CCDF of the PAPR according to the embodiment of the invention. A baseband signal was generated using a random signal as an input signal, using QPSK as a modulation scheme, and setting the number of subcarriers and the FFT size to 2048. FIG. 6 is a diagram illustrating simulated CCDF characteristics of the PAPRs of baseband signals in the case where the operator 14 performed no additional operation as in the related art and in the case of the embodiment. In the case of the embodiment, the lowest PAPR was used among PAPRs of baseband signals generated by the operator 14 from first data, data obtained by adding second data to the first data, and data obtained by subtracting the second data from the first data. The abscissa represents the PAPR (unit: dB), and the ordinate represents the CCDF of the PAPR. A solid-line graph represents the CCDF characteristic of the PAPR according to the related art. A dotted-line graph represents the CCDF characteristic of the PAPR according to the embodiment. Within the illustrated range, the PAPR according to the embodiment of the invention was reduced as compared with the PAPR according to the related art.

The modes of the invention are not limited to the foregoing embodiment. The modulation scheme of the modulator 11 is not limited to QPSK, but PSK (Phase Shift Keying), QAM (Quadrature Amplitude Modulation) or the like may be used instead of QPSK. The layout order of the modulator 11 and the serial-parallel converter 12 may be changed so that the serial-parallel converter 12 performs serial-parallel conversion on an input signal and assigns the parallel signal to subcarrier signals, and then the modulator 11 modulates individual data series in the parallel signal by a predetermined modulation scheme. In this case, the demodulation process is carried out on the reception side with the layout order of the demodulator 31 and the parallel-serial converter 32 being changed. As a data series which is used by the shifters 15, 37, a PN (Pseudorandom Noise) sequence or the like may be used instead of a CAZAC sequence. In addition, the operator 14 may be configured to generate a baseband signal from either data obtained by adding second data to first data or data obtained by subtracting the second data from the first data. The configuration of the operator 14 to perform either addition or subtraction can further simplify the process of suppressing an increase in PAPR.

The IFFT units 13, 16, 36 may be configured to perform an IDFT instead of an IFFT. The FFT unit 33 may be configured to perform a DFT instead of an FFT.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A communication apparatus for communicating with another apparatus in orthogonal frequency-division multiplexing wireless communication, the communication apparatus comprising:
   a modulator that modulates an input signal by a predetermined modulation scheme, and assigns the modulated input signal to subcarriers with frequency components orthogonal to each other, thereby generating a subcarrier modulation signal;
   a first transformer that performs an inverse fast Fourier transformation on the subcarrier modulation signal to generate first data;
   a shifter that shifts a predetermined data series which is a set of data in a predetermined direction by a predetermined number of times to generate a shift sequence, the predetermined data series having an autocorrelation property such that an autocorrelation value of the predetermined data series with a data series whose data has not been shifted is higher than an autocorrelation value of the predetermined data series with a data series whose data has been shifted;
   a second transformer that performs an inverse fast Fourier transformation on the shift sequence to generate second data;
   a calculator that respectively generates baseband signals from the first data and data obtained by adding the second data to the first data and data obtained by subtracting the second data from the first data, and calculates a PAPR (Peak-to-Average Power Ratio) of each of the baseband signals;
   wherein processes of the shifter, the second transformer, and the calculator are repeated with the predetermined number of times to shift the predetermined data series being changed, until detection of a baseband signal whose PAPR matches with a predetermined reference, or until completion of one cycle of shifting of the data in the predetermined data series, and
   wherein the communication apparatus further comprises a transmitter that generates a transmission signal from that of the generated baseband signals which matches with a reference for determining the transmission signal, and transmits the transmission signal.

2. The communication apparatus according to claim 1, wherein the shifter uses a CAZAC sequence as the predetermined data series.

3. The communication apparatus according to claim 2, wherein the shifter uses a Chu sequence as the CAZAC sequence.

4. The communication apparatus according to claim 3, wherein an each element in the Chu sequence is defined by a complex trigonometric function having, as a phase, a value obtained by multiplying a phase of a half period of the subcarriers by a square of a number indicating the each element and dividing by a size of a fast Fourier transformation.

5. A communication apparatus for communicating with another apparatus in orthogonal frequency-division multiplexing wireless communication, the communication apparatus comprising:
- a receiver that receives a transmission signal and generates a baseband signal;
- a serial-parallel converter that performs serial-parallel conversion on the baseband signal to generate a parallel signal;
- a reception-side shifter that shifts a predetermined data series which is a set of data in a predetermined direction by a predetermined number of times to generate a reception shift sequence, the predetermined data series having an autocorrelation property such that an autocorrelation value of the predetermined data series with a data series whose data has not been shifted is higher than an autocorrelation value of the predetermined data series with a data series whose data has been shifted;
- a third transformer that performs an inverse fast Fourier transformation on the reception shift sequence to generate third data; and
- a correlation determiner that determines based on a predetermined reference whether the parallel signal and the third data are correlated with each other;
- wherein processes of the reception-side shifter, the third transformer, and the correlation determiner are repeated with the predetermined number of times to shift the predetermined data series being changed, until it is detected that the parallel signal and the third data are correlated with each other, or until one cycle of shifting of the data in the predetermined data series is completed, and
- wherein the communication apparatus further comprises:
- a fourth transformer that generates a subcarrier modulation signal by performing a fast Fourier transformation on data obtained by subtracting the third data from the parallel signal when it is determined that the parallel signal and the third data have a positive correlation with each other, performing a fast Fourier transformation on data obtained by adding the third data to the parallel signal when it is determined that the parallel signal and the third data have a negative correlation with each other, and performing a fast Fourier transformation on the parallel signal when it is determined that the parallel signal and the third data are not correlated with each other even when one cycle of shifting of the data in the predetermined data series is completed; and
- a demodulator that demodulates the subcarrier modulation signal by a predetermined demodulation scheme.

6. The communication apparatus according to claim 5, wherein the reception-side shifter uses a CAZAC sequence as the predetermined data series.

7. The communication apparatus according to claim 6, wherein the reception-side shifter uses a Chu sequence as the CAZAC sequence.

8. The communication apparatus according to claim 7, wherein an each element in the Chu sequence is defined by a complex trigonometric function having, as a phase, a value obtained by multiplying a phase of a half period of the subcarriers by a square of a number indicating the each element and dividing by a size of a fast Fourier transformation.

9. A communication method that is executed by a communication apparatus communicating with another apparatus in orthogonal frequency-division multiplexing wireless communication, the communication apparatus method comprising:
- a modulation step of modulating an input signal by a predetermined modulation scheme, and assigns the modulated input signal to subcarriers with frequency components orthogonal to each other, thereby generating a subcarrier modulation signal;
- a first transformation step of performing an inverse fast Fourier transformation on the subcarrier modulation signal to generate first data;
- a shift step of shifting a predetermined data series which is a set of data in a predetermined direction by a predetermined number of times to generate a shift sequence, the predetermined data series having an autocorrelation property such that an autocorrelation value of the predetermined data series with a data series whose data has not been shifted is higher than an autocorrelation value of the predetermined data series with a data series whose data has been shifted;
- a second transformation step of performing an inverse fast Fourier transformation on the shift sequence to generate second data;
- a calculation step of respectively generating baseband signals from the first data and data obtained by adding the second data to the first data and data obtained by subtracting the second data from the first data, and calculating a PAPR (Peak-to-Average Power Ratio) of each of the baseband signals;
- wherein processes of the shift step, the second transformation step, and the calculation step are repeated with the predetermined number of times to shift the predetermined data series being changed, until detection of a baseband signal whose PAPR matches with a predetermined reference, or until completion of one cycle of shifting of the data in the predetermined data series, and
- wherein the communication method further comprises a transmission step of generating a transmission signal from that of the generated baseband signals which matches with a reference for determining the transmission signal, and transmits the transmission signal.

10. A communication method that is executed by a communication apparatus communicating with another apparatus in orthogonal frequency-division multiplexing wireless communication, the communication apparatus method comprising:
- a reception step of receiving a transmission signal and generates a baseband signal;
- a serial-parallel conversion step of performing serial-parallel conversion on the baseband signal to generate a parallel signal;
- a reception-side shift step of shifting a predetermined data series which is a set of data in a predetermined direction by a predetermined number of times to generate a reception shift sequence, the predetermined data series having an autocorrelation property such that an autocorrelation value of the predetermined data series with a data series whose data has not been shifted is higher than an autocorrelation value of the predetermined data series with a data series whose data has been shifted;

a third transformation step of performing an inverse fast Fourier transformation on the reception shift sequence to generate third data;

a correlation determining step of determining based on a predetermined reference whether the parallel signal and the third data are correlated with each other;

wherein processes of the reception-side shift step, the third transformation step, and the correlation determining step are repeated with the predetermined number of times to shift the predetermined data series being changed, until it is detected that the parallel signal and the third data are correlated with each other, or until one cycle of shifting of the data in the predetermined data series is completed, and wherein the communication method further comprises:

a fourth transformation step of generating a subcarrier modulation signal by performing a fast Fourier transformation on data obtained by subtracting the third data from the parallel signal when it is determined that the parallel signal and the third data have a positive correlation with each other, performing a fast Fourier transformation on data obtained by adding the third data to the parallel signal when it is determined that the parallel signal and the third data have a negative correlation with each other, and performing a fast Fourier transformation on the parallel signal when it is determined that the parallel signal and the third data are not correlated with each other even when one cycle of shifting of the data in the predetermined data series is completed; and a demodulation step of demodulating the subcarrier modulation signal by a predetermined demodulation scheme.

* * * * *